United States Patent [19]
Watanabe et al.

[11] Patent Number: 5,203,588
[45] Date of Patent: Apr. 20, 1993

[54] AUTOMATIC SEAT BELT APPARATUS

[75] Inventors: Yasutaka Watanabe; Yasuho Kitazawa, both of Aichi, Japan

[73] Assignee: Kabushiki Kaisha Tokai-Rika-Denki-Seisakusho, Japan

[21] Appl. No.: 893,088

[22] Filed: Jun. 3, 1992

[30] Foreign Application Priority Data

Jun. 14, 1991 [JP] Japan ............................. 3-044891[U]
Mar. 19, 1992 [JP] Japan ............................. 4-014811[U]

[51] Int. Cl.$^5$ ............................................. B60R 22/06
[52] U.S. Cl. ............................................. 280/804
[58] Field of Search ................. 280/808, 801, 804; 297/483, 468, 469

[56] References Cited

U.S. PATENT DOCUMENTS 5,102,165  4/1992  Araki et al. .................... 280/804

FOREIGN PATENT DOCUMENTS 355354  5/1991  Japan .

Primary Examiner—Karin L. Tyson
Attorney, Agent, or Firm—Sixbey, Friedman, Leedom & Ferguson

[57] ABSTRACT

In an automatic seat belt apparatus, a first tape is connected to a drive source. A second tape is connected to a slider and transmits a driving force from the drive source to the slider via the first tape. When a webbing is applied, a slide piece abuts a stopper. The slide piece moves relatively with respect to a lock plate against an urging force of a compression coil spring. Along with movement of the slide piece, the maintenance of the tapes at a connected position of the lock plate is cancelled. The lock plate rotates due to the urging force of the compression coil spring, and a separated position, at which the first tape and the second tape are separated, is maintained.

21 Claims, 7 Drawing Sheets

AUTOMATIC SEAT BELT APPARATUS

BACKGROUND OF THE INVENTION

1. Field of the Invention

The present invention relates to an automatic seat belt apparatus in which the height at which a webbing is applied can be adjusted.

2. Description of the Related Art

In conventional, well-known automatic seat belt apparatus of this type, a slider engaged with one end of a webbing is connected to a motor via a continuous elongated member, e.g., a flexible tape or a wire, and can be driven to move along a guide rail. At a portion of the guide rail towards the rear of the vehicle, the slider engages a slider maintaining member, which is connected to a strengthening member of a side wall of the vehicle body, or engages a shoulder anchor, such that the slider can be maintained to the vehicle body. Further, the position at which the slider is maintained to the behicle body can be changed by the position at which the shoulder anchor is connected to the strengthening member being changed along the guide rail.

Accordingly, when a vehicle occupant sits in the vehicle seat and closes the door, the slider moves along the guide rail toward the rear of the vehicle by the driving force of the motor. The slider abuts the shoulder anchor and is maintained thereat, so that the webbing is applied to the vehicle occupant. Thereafter, the maintaining position of the slider, i.e., the height at which the webbing is applied, can be adjusted by the vehicle occupant manually changing the connected position of the shoulder anchor. It is thereby possible for the webbing to be securely applied to vehicle occupants with different builds.

In this conventional automatic seat belt apparatus in which the height at which the webbing is applied is adjustable, the slider, which is maintained to the vehicle body via the shoulder anchor as described above, is connected to the motor via a continuous elongated body. Therefore, when the occupant moves the shoulder anchor together with the slider along the guide rail in order to adjust the height at which the webbing is applied, the motor is also driven via the elongated body. As a result, a large operational force is necessary to adjust the height at which the webbing is applied. There is also a drawback in that the workability is poor. Especially in cases in which a gear, which is attached to the motor and is used for deceleration, is a gear which cannot rotate reversely, the shoulder anchor cannot be moved. It is thereby difficult to adjust the height at which the webbing is applied.

In a prior application (Japanese Utility Model Laid-Open No. 3-55354), the applicant of the present invention proposed an automatic seat belt apparatus in which the elongated member is structured by a first elongated member and a second elongated member. The first elongated member is connected to a motor, and the second elongated member is connected to a slider. The first and second elongated members are connected to each other such that they can be separated from each other. When the slider is engaged with a slider maintaining member, the first and second elongated members are separated. The maintaining position of the slider to the vehicle body can be changed when the first and second elongated members are in this separated state. Therefore, the motor is not driven when the height at which the webbing is applied is adjusted.

In the proposed automatic seat belt apparatus described above, means explained hereinafter are used to connect the first and second elongated members so that they can be separated from each other. First, a lever is disposed between the first and second elongated members. A base end portion of the lever engages an opening formed in the second elongated member. An end claw portion of the lever engages an opening formed in the first elongated member. A spring is used to maintain these engaged states. The lever is urged to rotate towards the opening corresponding to the end claw portion of the lever, with the base end portion of the lever as the center of rotation. A stopper, which is engageable with the lever, is provided on a slider maintaining member. When the webbing is applied, the slider engages the slider maintaining member, and the lever and the stopper are moved closer relatively along the longitudinal direction of the elongated members. The lever and the stopper thereby engage and rotate against the urging force of the spring. Accordingly, the engagement of the end claw portion of the lever and the opening corresponding thereto is cancelled. The first and second elongated members thereby separate. Further, when application of the webbing is released, the lever and the stopper are separated relatively along with the separation of the slider and the slider maintaining member. The lever thereby returns to the angle at which it was originally positioned. The first and second elongated members may thereby be connected again.

When the lever rotates from a connected position, at which the first and second elongated members are connected, to a separated position, at which the first and second elongated members are separated, due to the urging force of the spring, an excessive load is applied to the opening with which the end claw portion of the lever is engaged. In particular, because the end claw portion of the lever moves horizontally with respect to the direction of movement of the first elongated member, the first elongated member can be easily deformed at the opening position. Further, an excessive amount of labor is necessary to manage the precision of strength of the elongated members and the precision of the apparatus.

There are limits to the manufacturing precision of each structural part. Therefore, a case may arise in which, for example, rattling occurs between the stopper and the lever. In this case, it is possible that the engaged state of the lever and the stopper may change. After the first and second elongated members separate, the lever would move from its predetermined angular position. The end claw portion of the lever would then be placed in the path of the first elongated member. In this situation, when the first elongated member moves along the path in order to connect with the second elongated member, the end claw portion of the lever collides with the end portion of the first elongated member. Accordingly, in this case also, the first elongated member can be easily deformed. Further, an excessive amount of labor is necessary to manage the strength of the elongated members and the precision of the apparatus.

SUMMARY OF THE INVENTION

With the aforementioned in view, it is an object of the present invention to provide an automatic seat belt apparatus in which a webbing applied height can be changed easily with a reduced operational force when a slider maintaining device is moved, and in which deformation and damage of elongated members is prevented and durability improves. When first and second elongated members are connected and separated, a connecting member can move between a connected position and a separated position without excessive load being applied to the elongated members. In this way, the above-mentioned objects can be realized.

In the present invention of the automatic seat belt apparatus, a guide rail is mounted to a vehicle body. A slider, to which one end of a webbing is fixed, is mounted so as to be movable in the longitudinal directions of the guide rail. A slider maintaining device freely engages and disengages from the slider. The slider maintaining device engages the slider at a webbing applied position of the slider, and maintains the slider. A maintaining position changing device can change the maintaining position of the slider with respect to the vehicle body when the slider and the slider maintaining device are engaged. A first elongated member is connected to a drive source. A second elongated member is connected to the slider and transmits a driving force from the drive source to the slider via the first elongated member. A connecting device connects the first elongated member and the second elongated member. The connecting device has a first member which is movable between a connected position, at which the first elongated member and the second elongated member are connected, and a separated position, at which the first elongated member and the second elongated member are separated. A connecting device maintaining device is movable between a first position, at which the first member of the connecting device is maintained at the connected position, and a second position, at which the connecting device is movable to the separated position. An urging device urges the first member of the connecting device in a direction of being displaced to the separated position, and urges the connecting device maintaining device such that the connecting device maintaining device is positioned at the first position. An operating device is provided in a vicinity of the webbing applied position, and moves the connecting device maintaining device against an urging force of the urging device by movement of the slider to the webbing applied position.

In the present invention structured as described above, with the slider engaged with the slider maintaining device, the connection of the first elongated member and the second elongated member by the connecting device is cancelled. Therefore, even if the slider maintaining device is moved together with the slider and the second elongated member, this moving force is not transmitted by the drive source. The slider maintaining device can be moved together with the slider and the second elongated member to a desired position by a slight operational force. Adjustment of the height at which the webbing is applied thereby becomes easy. Further, cancellation of the maintaining of the connecting device at the connected position and reinstatement of the maintaining are effected at the connected position of the connecting device. Therefore, when the first elongated member and the second elongated member separate or connect, the connecting device can move smoothly between the connected position and the separated position without resisting a maintaining force of the connected position maintaining device. As a result, excessive load will most likely not be applied to the elongated members. Deformation and damage of the elongated members is prevented, and durability improves.

DESCRIPTION OF THE PREFERRED EMBODIMENTS

Figure 2:
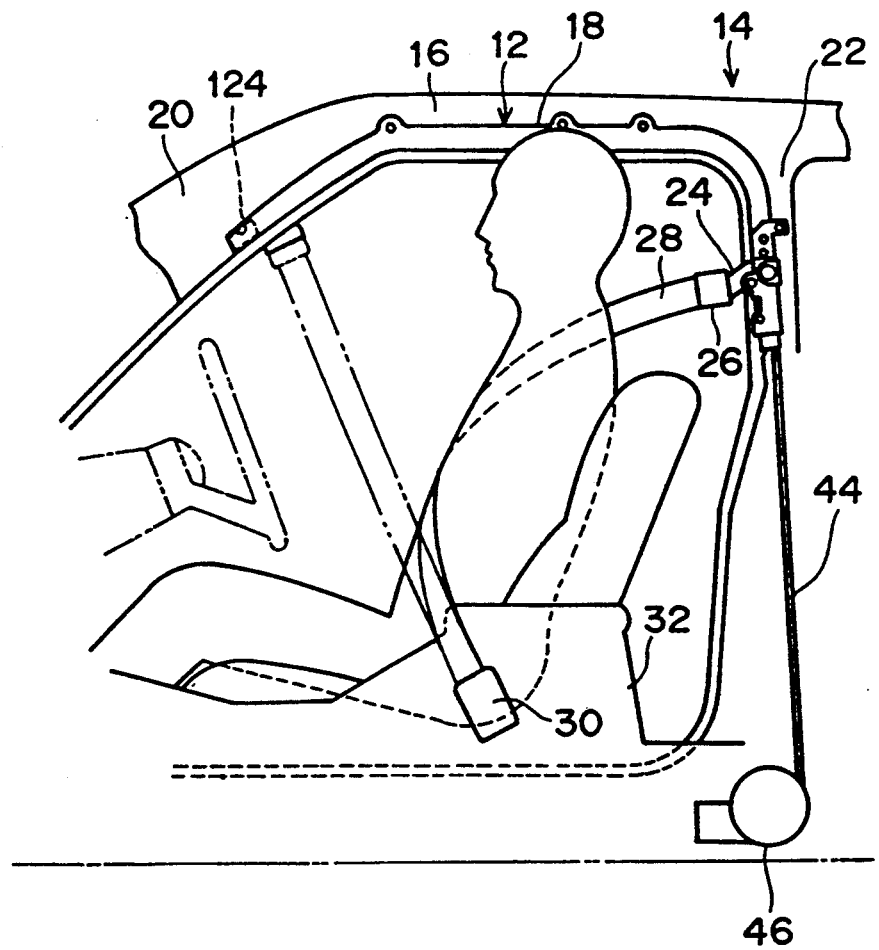
FIG. 2 is an entire structural view of the automatic seat belt apparatus.

An automatic seat belt apparatus 12 of the present invention is illustrated in the entire structural view of FIG. 2.

As shown in FIG. 2, a guide rail 18 is provided on a roof side 16 of a vehicle 14. A portion of the guide rail 18 towards the front of the vehicle 14 extends along a front pillar 20. A portion of the guide rail 18 towards the rear of the vehicle 14 is curved at a substantially right angle and extends downward along a center pillar 22.

A slider 24 is disposed so as to be movable within the guide rail 18. An end of a webbing 28 is joined to an end portion of the slider 24 via a connecting member 26 such as a buckle. Further, another end of the webbing 28 is wound in a roll by a webbing retractor 30, which is disposed at a central portion of the vehicle 14, and is accommodated in the webbing retractor 30. An inertia lock mechanism, which instantaneously prevents the pulling out of the webbing from the webbing retractor 30 when an acceleration sensor detects an emergency situation of the vehicle, is incorporated within the webbing retractor 30. The webbing retractor 30 is fixed, within a center console 32, to the vehicle body.

Figure 3:
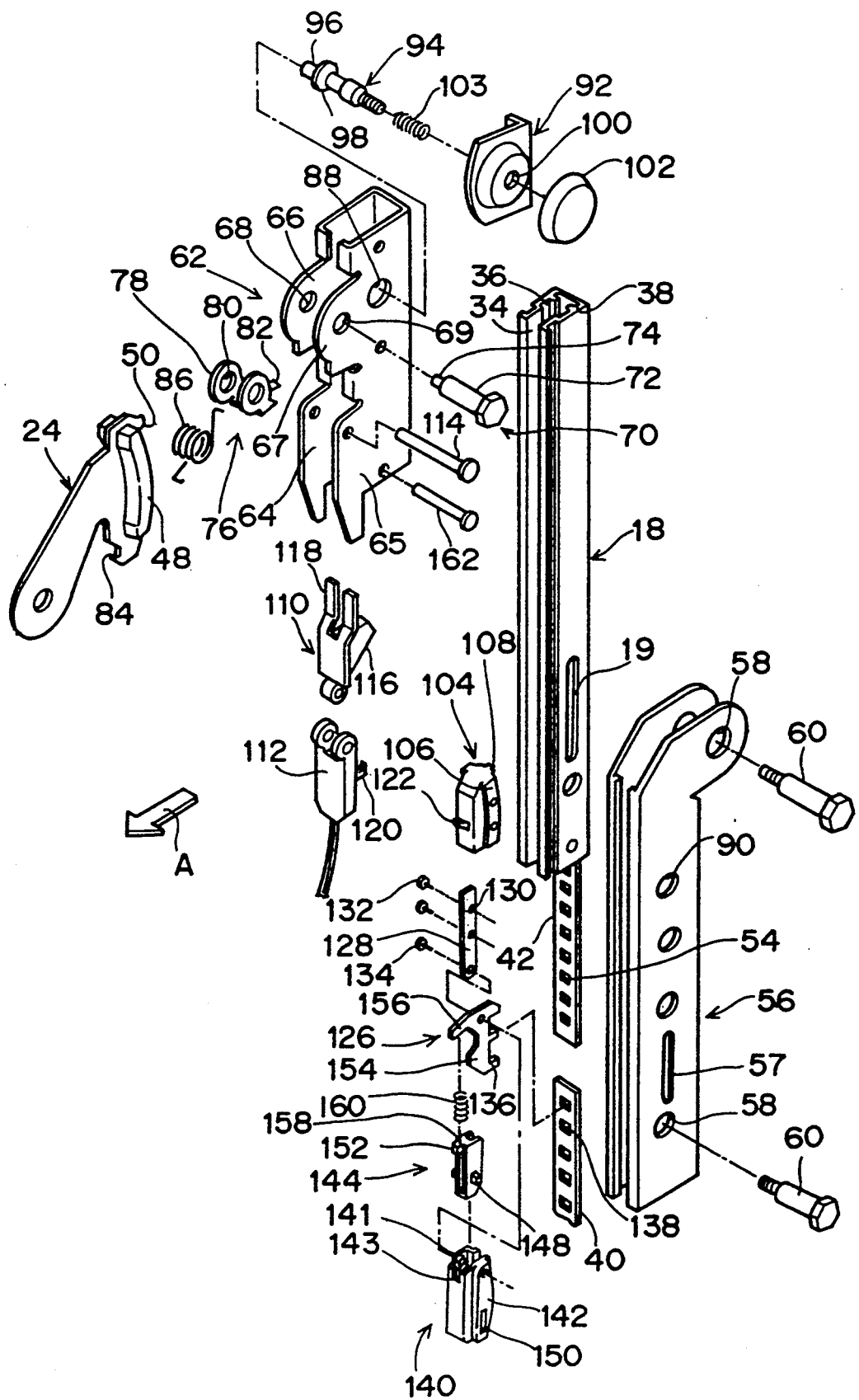
FIG. 3 is an exploded perspective view of principal portions of the automatic seat belt apparatus.
Figure 4:
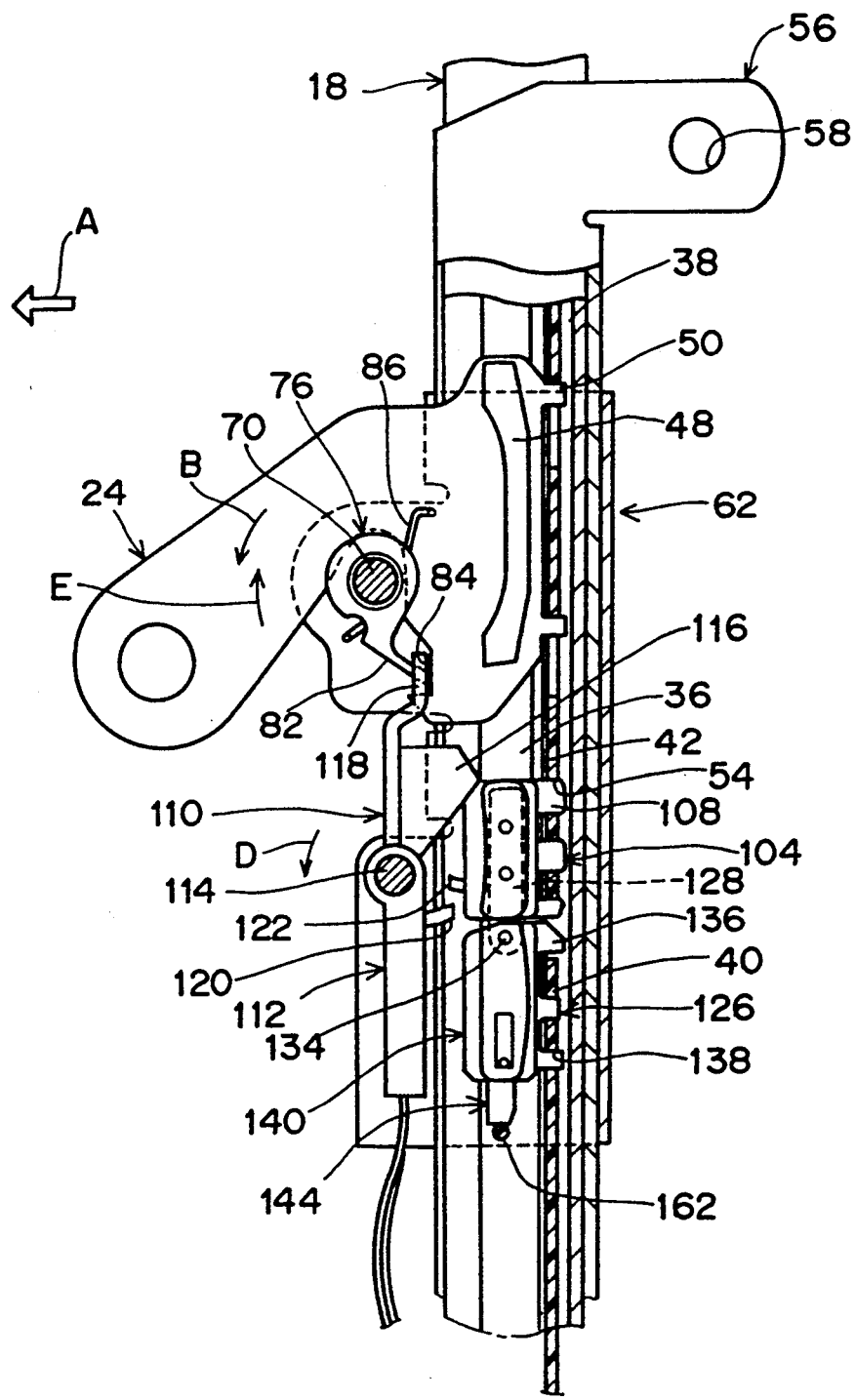
FIG. 4 is a vertical cross-sectional view of principal portions of the automatic seat belt apparatus.

As shown in FIGS. 3 and 4, a groove 34 is provided in the guide rail 18 along a longitudinal direction thereof. Concave portions 36 are formed in side walls of the groove 34 so as to oppose each other. A tape accommodating groove 38 is formed continuously along the base wall of the groove 34. A tape 40, serving as a first elongated member, and a tape 42, serving as a second elongated member, are slidably accommodated inside the tape accommodating groove 38, and are connected by a connecting member to be described later.

As shown in FIG. 2, the tape 40 is guided along an auxiliary guide 44, which extends from an end portion of the guide rail 18. The tape 40 is connected to a motor 46 constituting a driving apparatus. The tape 40 and the tape 42, which is connected to the tape 40, can be moved thereby.

As shown in FIGS. 3 and 4, the slider 24 is formed of a radially-enlarged guide portion 48 and a head portion 50. The side of the radially-enlarged guide portion 48 opposite the webbing forms a gentle arc shape along the longitudinal direction and has an arc-shaped surface. The radially-enlarged guide portion 48 and the head portion 50 are formed so as to be inserted into and slidable in the groove 34. The head portion 50 of the slider 24, which has been inserted into the groove 34, fits into openings 54 of the tape 42 and is thereby connected to the tape 42. The slider 24 can thereby move along the guide rail 18 as the tape 42 moves. In this case, the slider 24 can move, in the longitudinal direction of the tape 42, by only a small amount relative to the tape 42.

A reinforcement 56 is disposed on an outer periphery of a lower portion of the guide rail 18. The reinforcement 56 is formed by a steel plate being shaped substantially as a box, and covers the guide rail 18. The reinforcement 56 receives a load applied to the guide rail 18 and reinforces the guide rail 18. Circular holes 58 are respectively formed in an upper end curved portion and a lower end portion of the reinforcement 56. The reinforcement 56 is fixed to the vehicle main body by the insertion of bolts 60 through these circular holes 58. The lower circular hole 58 is positioned so that the bolt 60 inserted therethrough does not obstruct movement of the tapes 40, 42.

A movable plate 62, which forms a slider maintaining member, is disposed on an outer periphery of the reinforcement 56 in the longitudinal direction of the reinforcement 56, or in the vertical direction along the guide rail 18, so as to be slidable over a fixed range. The movable plate 62 is formed of a steel plate which is bent into a substantially U-shaped cross section with both sides formed as parallel leg plates 64, 65.

Substantially semicircular projecting portions 66, 67, which project towards the front of the vehicle body in the direction of arrow A, are formed respectively at the leg plates 64, 65. Circular holes 68, 69 are formed horizontally and coaxially in the respective projecting portions 66, 67. The circular hole 69 is formed with a diameter larger than that of the circular hole 68. A stepped anchor pin 70 is inserted into these circular holes 68, 69 so that a large diameter portion 72 of the stepped anchor pin 70 corresponds to the larger diameter circular hole 69, and a small diameter portion 74 of the stepped anchor pin 70 corresponds to the smaller diameter circular hole 68.

As shown in FIG. 4, the stepped anchor pin 70 is positioned more toward the front of the vehicle 14 than the radially-enlarged guide portions 48 of the slider 24. The stepped anchor pin 70 can thereby support the tension of the unillustrated webbing 28. Further, the stepped anchor pin 70 supports a pawl 76 (see FIG. 3). A pair of leg plates 78 is formed respectively at both side portions of the pawl 76. Pin insertion holes 80 are formed coaxially in the respective leg plates 78. The large diameter portion 72 of the stepped anchor pin 70 is inserted into these pin insertion holes 80. A claw portion 82 is formed at the side of the pawl 76 toward the rear of the vehicle 14. The claw portion 82 corresponds to a concave portion 84 formed in the slider 24 (see FIG. 4).

A torsion coil spring 86 is wound around the large diameter portion 72 of the stepped anchor pin 70, which axially supports the pawl 76. The torsion coil spring 86 urges the claw portion 82 in a direction of entering the concave portion 84 of the slider 24, that is, in the counterclockwise direction indicated by arrow B in FIG. 4, with the stepped anchor pin 70 as the center. When the claw portion 82 is in the concave portion 84 of the slider 24, the slider 24 is locked, and movement thereof upwardly along the guide rail 18 is impossible.

As illustrated in FIG. 3, a circular hole 88 is formed in a vicinity of the large diameter circular hole 69 of the leg plate 65 of the movable plate 62. When the movable plate 62 is slid in vertical directions, the circular hole 88 corresponds selectively to one of a plurality of circular holes 90 formed in the reinforcement 56. (The present embodiment includes three circular holes 90.) At the outer side of the circular hole 88, a lock pin 94, which forms a maintaining position changing means, is supported by a tension holder 92.

Figure 5:
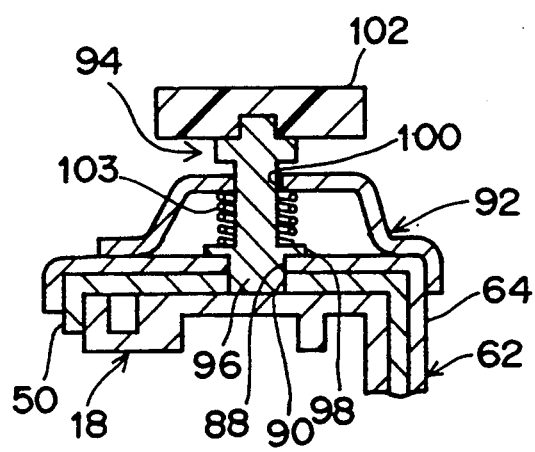
FIG. 5 is a cross-sectional view of peripheral parts of a knob.

As shown in FIG. 5, a large diameter portion 96 is formed at one end portion of the lock pin 94, and is inserted into the circular hole 88. After being inserted into the circular hole 88, the large diameter portion 96 is inserted into the circular hole 90. The movable plate 62 is thereby connected to and supported by the reinforcement 56. In this case, the large diameter portion 96 can be fitted into a different circular hole 90 by the sliding of the movable plate 62 along the reinforcement 56. The connected position of the movable plate 62 can be adjusted by the vertical movement of the movable plate 62 along the reinforcement 56. The position at which the movable plate 62 is maintained at the vehicle body can thereby be changed. Elongated holes 19 are formed in both side surfaces of a lower end portion of the guide rail 18 (see FIG. 3). Elongated holes 57 are formed in both side surfaces of the reinforcement 56 which oppose those side surfaces of the guide rail 18 lower end portion. A stopper 162, to be described later, can be inserted through the elongated holes 19, 57. When the maintained position of the movable plate 62 is changed, the stopper 162 can be vertically moved along with the vertical movement of the movable plate 62.

In addition, in FIG. 5, a disc-shaped flange portion 98 is formed so as to project radially from the large diameter portion 96 of the lock pin 94. After an intermediate portion of the lock pin 94 penetrates a through-hole 100 of the tension holder 92, another end of the lock pin 94 is screwed into a knob 102. A compression coil spring 103 is interposed between the tension holder 92 and the flange portion 98. The lock pin 94 is always urged downward in the direction of arrow C. Namely, the large diameter portion 96 of the lock pin 94 is urged in a direction of entering the circular hole 90 of the reinforcement 56.

Figure 1:
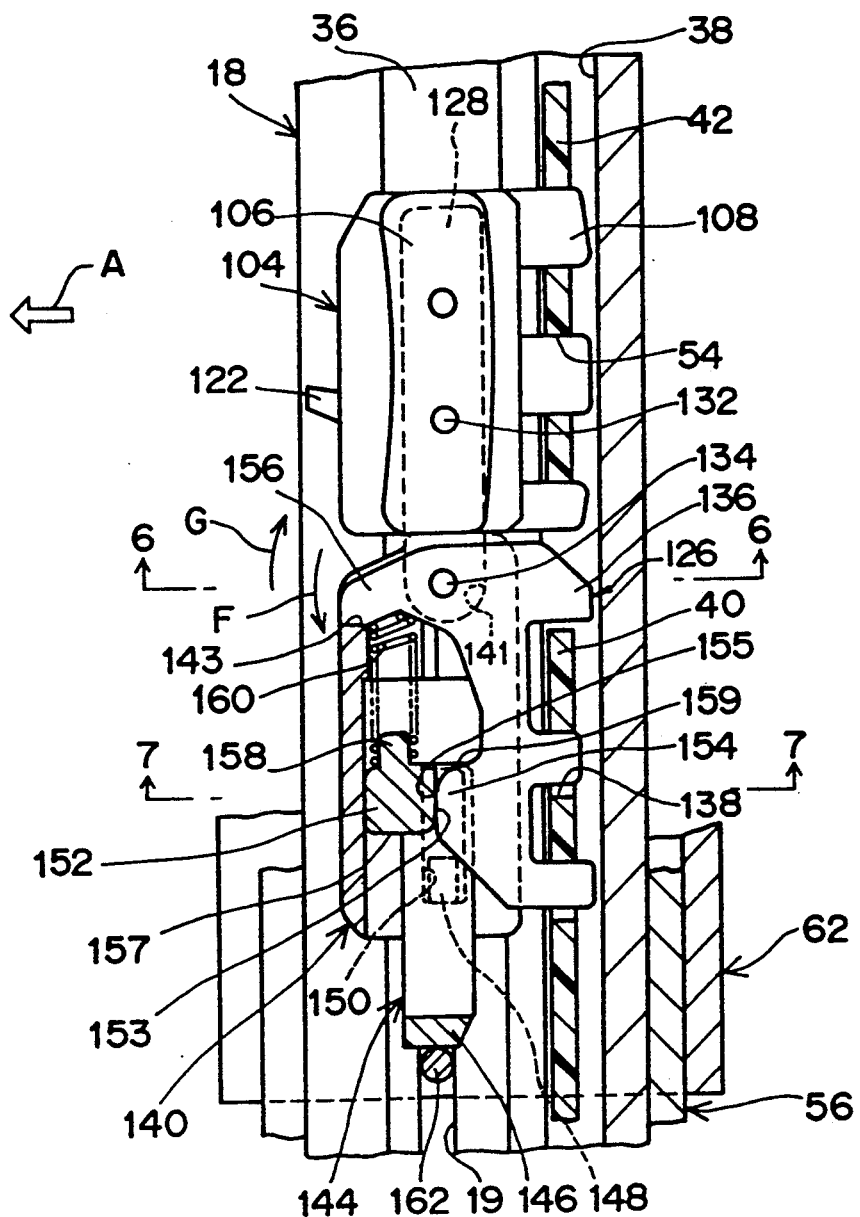
FIG. 1 is a enlarged vertical cross-sectional view of principal portions of an automatic seat belt apparatus of the present invention.

Next, as shown in FIGS. 3 and 4 and in the enlarged view in FIG. 1, a lost motion piece 104 is disposed beneath the slider 24 which is connected to the tape 42. The lost motion piece 104 is accommodated in the groove 34 of the guide rail 18 so as to be slidable in the longitudinal direction of the groove 34. Guide portions 106 are formed integrally on both side surfaces of the lost motion piece 104 so as to be guided in the concave portions 36 of the groove 34. A plurality of protrusions 108 are formed on the lost motion piece 104 and protrude toward the rear of the vehicle. As an example, there are three protrusions 108, which are formed on the lost motion piece 104 along the tape 42. The two upper protrusions 108 are inserted into two openings 54, which are located in the lowermost portion of the tape 42 and which oppose the two protrusions 108. The lowest protrusion 108 of the lost motion piece 104 abuts the bottom end surface of the tape 42. Accordingly, the lost motion piece 104 moves together with the tape 42. Further, the surfaces of the guide portions 106 which are opposite the webbing are formed in gentle arc-shapes along the longitudinal direction, in the same way as the radially-enlarged guide portions 48 of the slider 24.

A lost motion lever 110 and a rear end limit switch 112 are both disposed so as to correspond to the lost motion piece 104 and so as to engage with each other as the lost motion piece 104 moves. Both the lost motion lever 110 and the limit switch 112 are axially supported at the movable plate 62 by a pin 114.

A protruding portion 116, protruding towards the rear of the vehicle, and two thin elongated portions 118, which extend towards the pawl 76, are formed integrally with the lost motion lever 110. End portions of the elongated portions 118 sandwich the claw portion 82 of the pawl 76 therebetween, and abut the pawl 76. Accordingly, when a housing 140 and the lost motion piece 104 move downward together with the movement of the tape 42 and abut the protruding portion 116 of the lost motion lever 110, the lost motion lever 110 rotates counterclockwise, in the direction of arrow D in FIG. 4, with the pin 114 as the center of rotation. Moreover, due to the rotation of the lost motion lever 110, the elongated portions 118 push the claw portion 82 of the pawl 76, against the urging force of the torsion coil spring 86, in the direction in which the claw portion 82 moves away from the concave portion 84 of the slider 24, i.e., clockwise in the direction of arrow E in FIG. 4.

A contact 120 is formed so as to protrude from the rear end limit switch 112. The contact 120 can contact a projection 122, which is provided at the lost motion piece 104 and projects toward the front side of the vehicle. The rear end limit switch 122 is operated by the pushing of the contact 120 to the projection 122. After the rear end limit switch 122 is operated, there is a delay. Then, the motor 46 stops, and the tape 40 stops. Namely, the tape 40 does not stop at the position corresponding to the instant at which the rear end limit switch 112 is operated. Instead, the tape 40 moves further down and stops at a position at which the tape 40 is sufficiently separated from the lost motion piece 104 and a lock plate 126 to be described later. Accordingly, when the connected position of the above-mentioned movable plate 62 with respect to the reinforcement 56 is adjusted, the movable plate 62 is moved downward along the reinforcement 56. A topmost claw portion 136 of the lock plate 126, which moves downward together with the movable plate 62, contacts the tape 42 so that the tape 40 and the tape 42 are connected as described above. Further, it is not necessary to mount the rear end limit switch 112 to the movable plate 62 as in the present embodiment. The rear end limit switch 112 may, for example, be mounted to the guide rail 18 so that the contact 120 can be directly engaged with the tape 40 and operated, at a position sufficiently removed from the lock plate 126. In this way, the tape 40 is stopped at that position without any delay in the stopping of the motor 46.

As shown in FIG. 2, a front end limit switch 124 is disposed at the end portion of the guide rail 18 toward the front of the vehicle and is able to abut the slider 24. The front end limit switch 124 detects the stopping position of the slider 24 toward the front of the vehicle.

As shown in detail in the enlarged view of FIG. 1, the lock plate 126, serving as a connecting member, is disposed beneath the lost motion piece 104, which is connected to the tape 42. The lock plate 126 is connected to the lost motion piece 104 via a plate member 128. Three pin holes 130 are formed in the plate member 128 along the longitudinal direction. The plate member 128, except the lower end portion thereof, is fixed in a substantially buried state to a guide portion 106 of the lost motion piece 104 by pins 132 being inserted into the upper two pin holes 130 of the plate member 128. Further, a side surface of an upper end portion of the lock plate 126 is axially supported at the lower end portion of the plate member 128 by a pin 134 which is inserted into the remaining pin hole 130. Accordingly, the lock plate 126 is rotatable around the pin 134.

Figure 8:
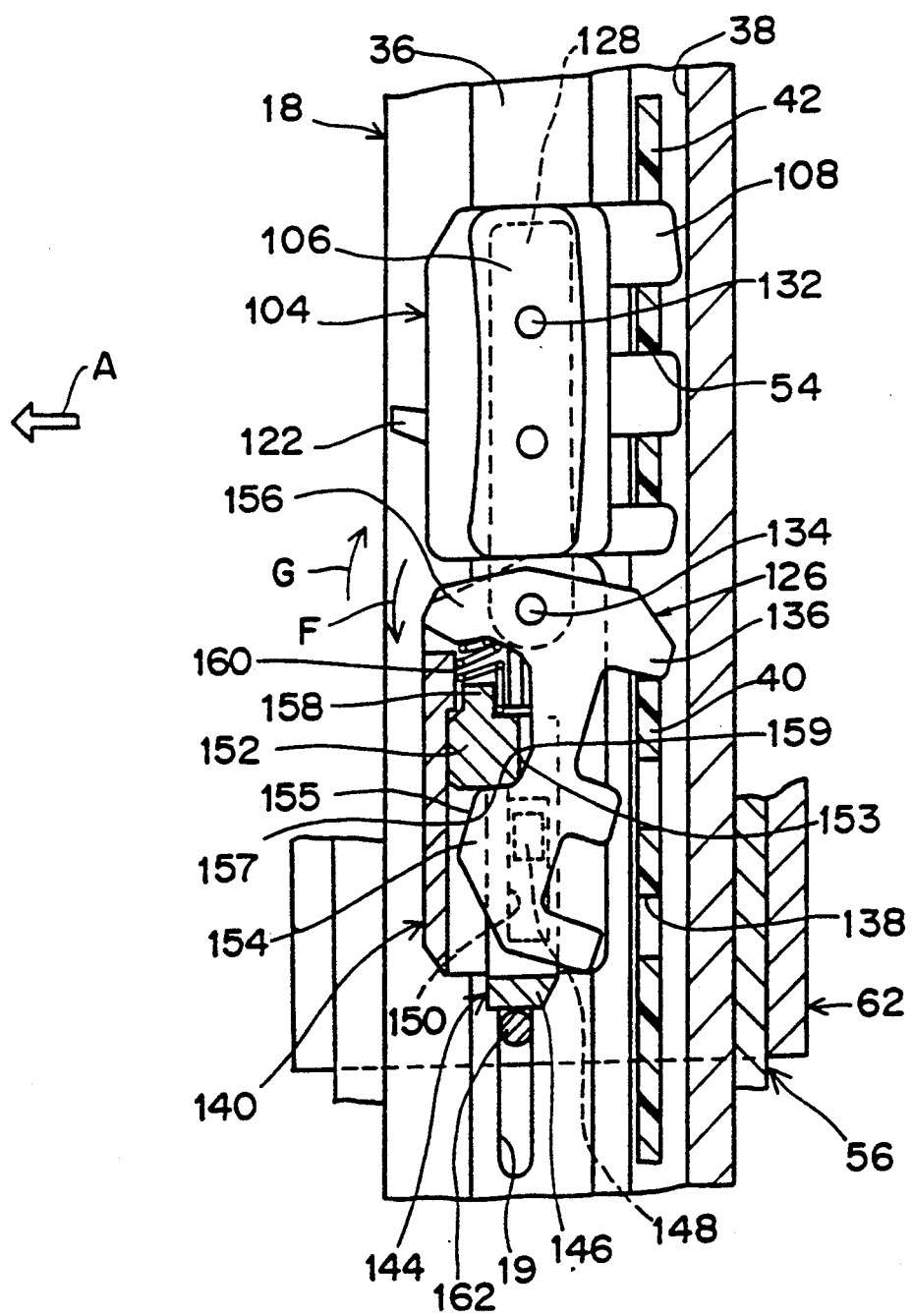
FIG. 8 is an enlarged vertical cross-sectional view of principal portions, showing a separated position of connecting members of FIG. 1.

At the side of the lock plate 126 toward the rear of the vehicle, the three claw portion 136 are formed along the longitudinal direction of the tape 40. The two lower claw portions 136 can fit into and engage with two openings 138, which are formed in the top end portion of the tape 40 and correspond to the claw portions 136. The bottom surface of the uppermost claw portion 136 is disposed so as to oppose the top end surface of the tape 40. As illustrated in FIG. 1, the claw portions 136 are fit into the openings 138 of the tape 40, and the tape 42 and the tape 40 are connected and move together. In FIG. 8, the connection is cancelled, and the tape 40 and the tape 42 separate. The lock plate 126 can be moved, with the pin 134 as the center of rotation, between the connected position shown in FIG. 1 and the separated position shown in FIG. 8.

Figure 6:
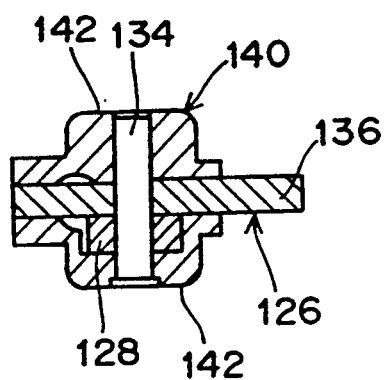
FIG. 6 is a cross-sectional view taken along line 6—6 of FIG. 1.

As shown in FIG. 6, the lock plate 126 is accommodated within the housing 140. At the housing 140, vertical sides and a side towards the rear of the vehicle form an open, substantially U-shaped horizontal cross section. The housing 140 is accommodated in the groove 34 of the guide rail 18 so as to be slidable along the groove 34 in the longitudinal direction. FIG. 3 shows guide portions 142 formed on both side surfaces of the housing 140 that are guided within the concave portions 36 of the groove 34. Further, the lock plate 126 is axially secured to an upper end portion of the housing 140 by the above-mentioned pin 134, which supports the lock plate 126 so that the lock plate 126 can rotate with respect to the plate member 128. The lock plate 126 can thereby slide longitudinally along the groove 34 of the guide rail 18, together with the housing 140. An accommodating groove 141 accommodates a lower end portion of the plate member 128. Surfaces of the guide portions 142 which are opposite the webbing are formed as gentle arc-shapes along the longitudinal direction, in the same way as the guide portions 106 of the lost motion piece 104 and the radially-enlarged guide portions 48 of the slider 24 are formed.

Figure 7:
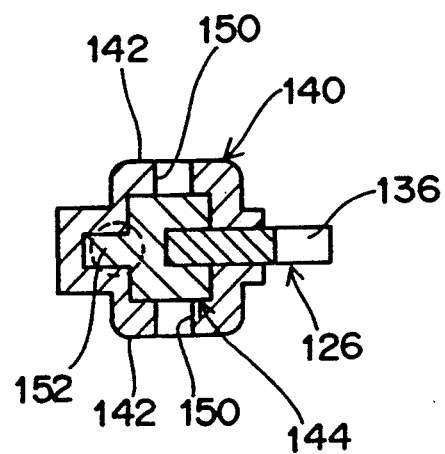
FIG. 7 is a cross-sectional view taken along line 7—7 of FIG. 1.

As shown in FIG. 7, a slide piece 144, which forms a connected position maintaining member, is accommodated within the housing 140. Both side walls and bottom wall 146 of the slide piece 144 form a substantially U-shaped vertical cross section. A lower end portion of the lock plate 126 is accommodated within the slide piece 144. Guide protrusions 148, which are formed at both side walls of the slide piece 144, engage with and are guided by openings 150, which are formed in the guide portions 142 of the housing 140. The slide piece 144 is thereby slidable along the direction in which the housing 140 slides or along the longitudinal direction of the groove 34 of the guide rail 18, within a fixed range from a maintaining position to an allowable position, which will be described later.

As shown in FIG. 1, at an edge of an upper end opening of the slide piece 144, an engaging protruded portion 152 is integrally formed, on a side towards the front of the vehicle, along the sliding direction of the slide piece 144. On the other hand, at a lower end portion of the lock plate 126, a corresponding engaging protruded portion 154, which corresponds to the above-mentioned engaging protruced portion 152, is integrally formed with the lock plate 126 at a side towards the front of the vehicle. A rear surface 153 of the engaging protruded portion 152 and a front surface 155 of the corresponding engaging protruded portion 154 are abutted at the connected position of the lock plate 126 at which the tape 40 and the tape 42 are connected. The rear surface 153 and the front surface 155 control the movement of the lock plate 126 from the connected position to the separated position, and maintain the lock plate 126 at the connected position. Moreover, a bottom surface of a nose portion 156, which protrudes toward the front of the vehicle at an upper end portion of the lock plate 126, engages a notch 143 formed in the upper end of the front wall surface of the housing 140. The counterclockwise rotation of the lock plate 126, shown by arrow F in FIG. 1, is controlled by the engagement of the nose portion 156 and the notch 143. This engaged state can be maintained to a proper degree so that the claw portions 136 are not excessively inserted into the openings 138 of the tape 40.

A compression coil spring 160, forming an urging means, is interposed between the bottom surface of the nose portion 156 of the lock plate 126 and a projection 158, which is disposed at the engaging protruded portion 152 of the slide piece 144 and projects further towards the nose portion 156. The compression coil spring 160 is disposed along the sliding direction of the slide piece 144. The compression coil spring 160 urges the slide piece 144 toward the maintaining position, which will be described later. The relative movement between the lock plate 126 and the slide piece 144 along the tapes 40, 42, in which the lock plate 126 is pushed downward with respect to the slide piece 144, compresses the compression coil spring 160 so that the urging force thereof is gradually increased. At the maintaining position of the slide piece 144, the lock plate 126 is maintained at the connected position, as the rear surface 153 of the engaging protruded portion 152 and the front surface 155 of the corresponding engaging protruded portion 154 are engaged against the urging force of the compression coil spring 160 when the urging force of the compression coil spring 160 increases. At the allowable position of the slide piece 144, the lock plate 126 can rotate in the clockwise direction shown by arrow G in FIG. 1, from the connected position to the separated position, as the engagement of the rear surface 153 of the engaging protruded portion 152 of the slide piece 144 and the front surface 155 of the corresponding engaging protruded portion 154 of the lock plate 126 is cancelled. When the slide piece 144 moves, relative to the lock plate 126, from the maintaining position to the allowable position, the lock plate 126 is moved toward the separated position, urged by the increased urging force of the compression coil spring 160. Then, as shown in FIG. 8, by the rotation of the lock plate 126 to the separated position, a bottom surface 157 of the engaging protruded portion 152 of the slide piece 144 engages with a top surface 159 of the corresponding engaging protruded portion 154 of the lock plate 126. The lock plate 126 is thereby maintained at the separated position. Accordingly, even if the lock plate 126 moves relatively to the slide piece 144 such that the lock plate 126 is pushed further downward relative to the slide piece 144, the urging force of the compression coil spring 160 becomes even greater. The lock plate 126 is thereby maintained more strongly at the separated position. The relative movement of the lock plate 126 and the slide piece 144 separating along the tapes 40, 42 is controlled by the engagement of the bottom surface 157 of the engaging protruded portion 152 of the slide piece 144 and the top surface 159 of the corresponding engaging protruded portion 154 of the lock plate 126.

The bottom wall 146 of the engaging protruded portion 152 of the slide piece 144 is engageable with a pin-shaped stopper 162, which is mounted to the lower end portion of the movable plate 62 and which forms an operating means. The stopper 162 is disposed in the path of movement of the slide piece 144 along the tape 40. When the slider 24 and the movable plate 62 engage via the stepped anchor pin 70, the lock plate 126 moves downward, as does the slide piece 144 which approaches and abuts the stopper 162. The slide piece 144 moves downward relative to the lock plate 126 against the urging force of the compression coil spring 160. Along with this movement, the urging force of the compression coil spring 160 gradually increases. When the slide piece 144 reaches the position at which the rear surface 153 of the engaging protruded portion 152 of the slide piece 144 is released from engagement with the front surface 155 of the corresponding engaging protruded portion 154, the maintaining of the lock plate 126 at the connected position is released. Simultaneously, the lock plate 126 is allowed to rotate to the separated position. On the other hand, when the slider 24 and the movable plate 62 separate, the tape 40 moves upward, and the top end thereof pushes the uppermost claw portion 136 of the lock plate 126. Correspondingly, the lock plate 126 rotates from the separated position shown in FIG. 8 to the connected position shown in FIG. 1, against the urging force of the compression coil spring 160. The engagement of the bottom surface 157 of the engaging protruded portion 152 of the slide piece 144 and the top surface 159 of the corresponding engaging protruded portion 154 of the lock plate 126 is cancelled. By the tape 40 moving further upward, the lock plate 126 moves upward along with the tape 40, and the slide piece 144 separates from the stopper 162. Along with these movements, the rear surface 153 of the engaging protruded portion 152 of the slide piece 144 engages with the front surface 155 of the corresponding engaging protruded portion 154 of the lock plate 126. The lock plate 126 returns to being maintained at the connected position.

Next, the operation of the embodiment will be described.

First, when the vehicle occupant opens the door and sits in the vehicle seat, the slider 24 is disposed at the end portion of the guide rail 18 towards the front of the vehicle. A wide space is maintained between the webbing 28 and the seat so that it is easy to sit down. In this state, the tapes 40 and 42 are connected. Further, the front end limit switch 124 is ON so that it detects the slider 24. The motor 46 is stopped.

When the vehicle occupant sits down and shuts the door, an unillustrated door switch activates, and the motor 46 rotates properly. The driving force of the motor 46 is transferred to the tape 42 via the tape 40, thereby generating tensile force in the tape 42. Due to this tensile force, the slider 24 moves along the guide rail 18 towards the rear of the vehicle. At the same time that the slider 24 moves, the front end limit switch 124 is turned OFF.

The slider 24 moves along with the tapes 40, 42 toward the rear of the vehicle. The lost motion piece 104, which is connected to the tape 42, abuts the protruding portion 116 of the lost motion lever 110. The lost motion lever 110 rotates counterclockwise in the direction of arrow D shown in FIG. 4. Along with the rotation of the lost motion lever 110, the pawl 76 rotates clockwise in the direction of arrow E shown in FIG. 4 by the elongated portions 118, against the urging force of the tension coil spring 86, and with the stepped anchor pin 70 as the center of rotation. While this state is maintained, the lower end portion of the slider 24, i.e., the end of the concave portion 84, passes downward, as illustrated in FIG. 4, without any interference from the claw portion 82 of the pawl 76.

When the lost motion piece 104 passes the protruded portion 116 of the lost motion lever 110 as the slider 24 moves along, the pressing of the pawl 76 by the lost motion lever 110 is cancelled. As a result, the pawl 76 is rotated counterclockwise in the direction of arrow B shown in FIG. 4, by the urging force of the tension coil spring 86. The claw portion 82 enters the concave portion 84 of the slider 24. Accordingly, the slider 24 is securely locked to the movable plate 62 via the pawl 76 and the stepped anchor pin 70. The upward movement of the slider 24 is obstructed by the pawl 76. The slider 24 is allowed to move downward to the point where the downward movement thereof is prevented by the slider 24 abutting the stepped anchor pin 70. Thereafter, the tapes 40, 42 continue to move. When the bottom wall 146 of the slide piece 144, which moves downward together with the tape 42, abuts the stopper 162, the lock plate 126 moves downward relative to the slide piece 144. Along with this motion, the urging force of the compression coil spring 160 increases. The rear surface 153 of the engaging protruded portion 152 of the slide piece 144 comes apart from the front surface 155 of the corresponding engaging protruded portion 154 of the lock plate 126. Rotation of the lock plate 126 in the direction of arrow G in FIG. 1 is thereby permitted. Due to the increased urging force of the compression coil spring 160, the lock plate 126 is urged from the connected position shown in FIG. 1 to the separated position shown in FIG. 2.

Accordingly, the claw portions 136 of the lock plate 126 are pulled out from the openings 138 of the tape 40. The connection between the tape 40 and the tape 42 is cancelled, and only the tape 40 moves downwardly. At the same time the connection between the tape 40 and the tape 42 is cancelled, the projection 122 of the lost motion piece 104 pushes downward on the contact 120 of the rear end limit switch 112. The rear end limit switch 112 is thereby operated. After the operation of the rear end limit switch 112, the motor 46 is stopped by an unillustrated control device after a delay. The movement of the tape 40 thereby stops. The webbing is now applied to the occupant. The slider 24 is strongly locked to the movable plate 62 via the pawl 76 and the stepped anchor pin 70. Further, after the claw portion 82 of the pawl 76 enters into the concave portion 84 of the slider 24, the bottom wall 146 of the slide piece 144 abuts on the stopper 162. Then, the lock plate 126 is rotated, and the connection of the tape 40 and the tape 42 is cancelled. However, it is possible for the bottom wall 146 of the slide piece 144 to abut on the stopper 162 before the claw portion 82 of the pawl 76 enters into the concave portion 84 of the slider 24, and for the connection of the tape 40 and the tape 42 to be completely cancelled when the claw portion 82 enters the concave portion 84. In this case, after the claw portion 82 enters into the concave portion 84, there is no need to allow the slider 24 to move downward.

After the webbing 28 has been applied, the knob 102 is operated to adjust the webbing applied height. Namely, with the knob 102 pulled out towards the interior of the vehicle, the movable plate 62 is moved upward. At the optimal height for the occupant, one of the circular holes 90 of the reinforcement 56 and the circular hole 88 of the movable plate 62 are made to correspond. The knob 102 is released from being pulled out. After the knob 102 is released, the lock pin 94 moves in the transverse direction of the vehicle toward the vehicle exterior by the urging force of the compression coil spring 103, and returns. The movable plate 62 is thereby fixed. As a result, the webbing is applied to the occupant at an optimal height, and the occupant is reliably restrained.

In this case, when the height at which the webbing is applied is adjusted, the connection of the tape 40 and the tape 42 is cancelled. As a result, even if the movable plate 62 is moved together with the slider 24 and the tape 42, this moving force will not be transmitted to the tape 40 or to the motor 46 connected thereto. Accordingly, the movable plate 62 can be moved along with the slider 24 and the tape 42 to the occupant's desired position by a slight operational force. The webbing applied height can be easily adjusted.

Next, cancellation of the application of the webbing 28 is described. When the occupant opens the door, the door switch is turned on, and the motor 46 rotates backward. Accordingly, as shown in FIG. 8, the tape 40 moves upward. The upper end surface of the tape 40 abuts the uppermost claw portion 136 of the lock plate 126. Along with this upward movement, the lock plate 126 rotates counterclockwise in the direction of arrow F from the separated position shown in FIG. 8 against the urging force of the compression coil spring 160. When the lock plate 126 moves to the connected position shown in FIG. 1, the claw portions 136 enter into the openings 138 of the tape 40. The tape 42 is again connected to the tape 40 by the lock plate 126. The tape 40 and the tape 42 begin to move together. Next, along with the movement of the tape 40 and the tape 42, the slide piece 144 moves away from the stopper 162. Due to the urging force of the compression coil spring 160, the rear surface 153 of the engaging protruded portion 152 of the slide piece 144 moves relative to and engages the front surface 157 of the corresponding engaging protruded portion 154 of the lock plate 126. The lock plate 126 is thereby maintained again at the connected position.

Meanwhile, along with the upward movement of the tapes 40 and 42, the lost motion piece 104 abuts on the protruding portion 116 of the lost motion lever 110. When the lost motion piece 104 abuts on the protruding portion 116, the lost motion lever 110 rotates counterclockwise in the direction of arrow D in FIG. 4. Accordingly, the pawl 76 rotates clockwise in the direction of arrow E in FIG. 4 via the elongated portions 118 of the lost motion lever 110. The claw portion 82 of the pawl 76 is pulled out from the concave portion 84 of the slider 24. It then becomes possible for the slider 24 to move upwardly. Along with the movement of the tape 40 and the tape 42, the slider 24 moves along the guide rail 18 towards the front of the vehicle. Further, the rear end limit switch 112 is turned off at the same time that the slider 24 moves.

When the slider 24 reaches the front end portion, in the longitudinal direction of the vehicle, of the guide rail 18, the front end limit switch 124 is again turned on, and the motor 46 stops. Accordingly, a wide space is formed between the webbing 28 and the seat. The occupant can thereby easily get out of the seat.

In this way, when the slider 24 reaches the rear end portion of the guide rail 18 and the webbing is applied to the occupant, the connection of the tape 40 and the tape 42 is automatically cancelled. Therefore, the applied height of the webbing can be regulated by a slight operational force.

Moreover, at the connected position of the lock plate 126, the engagement of the rear surface 153 of the engaging protruded portion 152 of the slide piece 144 and the front surface 155 of the corresponding engaging protruded portion 154 of the lock plate 126 is cancelled and then returns. Further, the maintaining of the lock plate 126 at the connected position is cancelled and then returns. Therefore, when the tape 40 and the tape 42 connect and separate, the lock lever 126 can move smoothly between the connected position and the separated position without resisting the maintaining force which maintains the lock plate 126 at the connected position. No excessive force is applied to the openings 138 of the tape 40. Moreover, even if there is rattling between the structural parts due to lack of manufacturing precision or the like, after the lock plate 126 moves once to the separated position, the compression coil spring 160 is maintained in a compressed state by the engagement of the bottom surface 157 of the engaging protruded portion 152 of the slide piece 144 and the top surface 159 of the corresponding engaging portion 154 of the lock plate 126. Therefore, even if, for example, there is relative movement between the stopper 162 and the slide piece 144 due to shaking, there is no effect on the urging force of the compression coil spring 160. The lock plate 126 is reliably maintained at the separated position. Deformation and damage of the elongated members is prevented, and durability improves. In addition, when the tape 40 and the tape 42 separate, the rotation of the lock plate 126 does not depend on the movement of the tape 40, but is effected instantaneously due to the urging force of the compression coil spring 160. Therefore, the claw portions 136 can be drawn out of the openings 138 without a horizontal force being applied to the openings 138. On the other hand, when the tape 40 and the tape 42 connect, the lock plate 126 is moved from the separated position to the connected position against the urging force of the compression coil spring 160. However, by the upper end surface of the tape 40 abutting the bottom surface of the uppermost claw portion 136 and pushing the bottom surface upwardly, and the claw portions 136 being inserted into the openings 138 in a non-contact state, load applied horizontally with respect to the moving direction of the tape 40 can be restrained even further. In this case, the urging force of the compression coil spring 160 does not have to be a force large enough to maintain the lock plate 126 at the connected position. Therefore, the force applied to the tape 40 may be extremely small.

Further, the present invention is not limited to the above-described embodiment; a number of variations are possible. For example, in the above embodiment, the urging means is formed by the compression coil spring 160. The lock plate 126 and the slide piece 144 are moved relatively in accordance with the cancelling of the engagement or the reinstatement of the engagement of the rear surface 153 of the engaging protruded portion 152 of the slide piece 144 and the front surface 155 of the corresponding engaging portion 154 of the lock plate 126. The urging force of the compression coil spring 160 thereby gradually increases or decreases. However, the lock plate 126 may ordinarily be urged to the separated position at a constant urging force. In short, it suffices if the retaining of the lock plate 126 at the connected position can be cancelled and if the retaining can be reinstated.

What is claimed is:

1. An automatic seat belt apparatus comprising:
   a guide rail mounted on a vehicle body;
   a slider to which one end of a webbing is fixed, and which is provided so as to be movable along a longitudinal direction of said guide rail;
   a slider maintaining means freely engaging and disengaging from said slider, and engaging said slider at a webbing restraining position so as to maintain said slider;
   a maintaining position changing means able to change a maintaining position of said slider with respect to the vehicle body when said slider and said slider maintaining means are engaged;
   a first elongated member connected to a drive source;
   a second elongated member connected to said slider, and transferring a driving force from said drive source to said slider via said first elongated member;
   connecting means for connecting said first elongated member and said second elongated member, said connecting means having a first member, said first member being displaceable between a connected position, at which said first and second elongated members are connected, and a separated position, at which said first and second elongated members are separated;
   connecting means maintaining means movable between a first position, at which said first member of said connecting means is maintained at said connected position by said connecting means maintaining means, and a second position, at which said connecting means is movable to said separated position;
   urging means for urging said first member of said connecting means in a direction of being displaced to said separated position, and for urging said connecting means maintaining means such that said connecting means maintaining means is positioned at said first position; and
   operating means provided in a vicinity of said webbing restraining position, for moving said connecting means maintaining means to said second position against an urging force of said urging means by movement of said slider to said webbing restraining position.

2. An automatic seat belt apparatus according to claim 1, wherein said connecting means maintaining means has a slide piece member, said slide piece member being able to move relative to said connecting means.

3. An automatic seat belt apparatus according to claim 2, wherein said first member of said connecting means has a lock plate member, said lock plate member being able to swing in longitudinal directions of said guide rail.

4. An automatic seat belt apparatus according to claim 3, wherein said connecting means has a lost motion piece member, said lost motion piece member transmitting the driving force from said drive source to said second elongated member.

5. An automatic seat belt apparatus according to claim 4, wherein said connecting means has a housing member, said lock plate member being able to swing between said connected position and said separated position with respect to said housing member.

6. An automatic seat belt apparatus according to claim 5, wherein said connecting means has a plate member, said plate member provided between said lock plate member and said lost motion piece member and connecting said lock plate member and said lost motion piece member.

7. An automatic seat belt apparatus according to claim 6, wherein said connecting means has a support pin, said support pin being fixed to said housing member and axially supporting said lock plate member such that said lock plate member can swing with respect to said housing member, and axially supporting one end portion of said plate member such that said plate member connects said housing member and said lock plate member.

8. An automatic seat belt apparatus according to claim 3, wherein said lock plate member has a plurality of claw portions engaging said first elongated member at said connected position.

9. An automatic seat belt apparatus according to claim 8, wherein an engagement of said plurality of claw portions and said first elongated member is cancelled when said lock plate member moves to said separated position.

10. An automatic seat belt apparatus according to claim 4, wherein said lost motion piece member has a plurality of claw portions usually engaging said second elongated member.

11. An automatic seat belt apparatus according to claim 1, wherein said operating means is a pin member, said pin member moving said slide piece member by an abutting of said slide piece member and said pin member.

12. An automatic seat belt apparatus according to claim 1, wherein said urging means is a spring member.

13. An automatic seat belt apparatus for use in vehicles, comprising:
- a guide rail mounted so as to hang, extend from a front portion of a vehicle body to a rear portion of a vehicle body;
- a slider to which one end of a webbing is fixed, and which is provided so as to be movable along a longitudinal direction of said guide rail;
- a slider maintaining means freely engaging and disengaging from said slider, and engaging said slider at a webbing restraining position so as to maintain said slider;
- a maintaining position changing means able to change a maintaining position of said slider with respect to the vehicle body when said slider and said slider maintaining means are engaged;
- a first tape connected to a drive source;
- a second tape connected to said slider, and transferring a driving force from said drive source to said slider via said first tape;
- connecting means displaceable between a connected position, at which said first tape and said second tape are connected, and a separated position, at which said first tape and said second tape are separated;
- a slide piece member able to move between a first position, at which said connecting means is maintained at said connected position, and a second position, at which said connecting means is movable to said separated position, relatively with respect to movement of said connecting means in longitudinal directions of said guide rail;
- an urging member urging said connecting means to said separated position in a direction so as to be movable, and urging said slide piece member such that said slide piece member is positioned at said first position; and,
- an operating member provided in a vicinity of said webbing restraining position, and moving slide piece member to said second position against an urging force of said urging member by movement of said slider to said webbing restraining position.

14. An automatic seat belt apparatus according to claim 13, wherein said connecting means has a lock plate member, said lock plate member being able to swing in longitudinal directions of said guide rail, and engaging said first tape at said connected position and being released from engagement with said first tape at said separated position, by a plurality of claw portions provided at said lock plate member.

15. An automatic seat belt apparatus according to claim 14, wherein said connecting means has a lost motion piece member, said lost motion piece member being usually engaged with said second tape by a plurality of claw portions provided at said lost motion piece member, and transferring the driving force from said drive source to said second tape.

16. An automatic seat belt apparatus according to claim 15, wherein said connecting member has a housing member, said lock plate member being able to swing between said connected position and said separated position with respect to said housing member.

17. An automatic seat belt apparatus according to claim 16, wherein said connecting means has a plate member, said plate member being provided between said lock plate member and said lost motion piece member, and connecting said lock plate member and said lost motion piece member.

18. An automatic seat belt apparatus according to claim 17, wherein said connecting means has a support pin, said support pin being fixed to said housing and axially supporting said lock plate member such that said lock plate member can swing with respect to said housing member, and axially supporting an end portion of said plate member such that said plate member connects said housing member and said lock plate member.

19. An automatic seat belt apparatus according to claim 13, wherein said operating member is a pin, said pin moving said slide piece member by abutting said slide piece member and said pin.

20. An automatic seat belt apparatus according to claim 13, wherein said urging member is a compression coil spring.

21. An automatic seat belt apparatus according to claim 13, wherein said guide rail is mounted from a front pillar to a center pillar of the vehicle.

* * * * *